United States Patent
Mori et al.

(10) Patent No.: US 9,121,694 B2
(45) Date of Patent: Sep. 1, 2015

(54) POSITION DETECTION DEVICE

(71) Applicant: Panasonic Corporation, Osaka (JP)

(72) Inventors: Tetsuya Mori, Osaka (JP); Jun Saiki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 266 days.

(21) Appl. No.: 13/896,815

(22) Filed: May 17, 2013

(65) Prior Publication Data

US 2014/0022559 A1   Jan. 23, 2014

(30) Foreign Application Priority Data

Jul. 17, 2012   (JP) .................................. 2012-158778

(51) Int. Cl.
| | |
|---|---|
| *G01B 11/02* | (2006.01) |
| *G01D 5/34* | (2006.01) |
| *G03B 7/00* | (2014.01) |
| *G01B 11/14* | (2006.01) |
| *G01B 11/00* | (2006.01) |
| *G01D 5/347* | (2006.01) |

(52) U.S. Cl.
CPC .............. *G01B 11/14* (2013.01); *G01B 11/002* (2013.01); *G01D 5/34707* (2013.01); *G01D 5/34776* (2013.01); *G03B 7/00* (2013.01)

(58) Field of Classification Search
CPC ............. G01B 11/002; G01D 5/34707; G01D 5/34776
See application file for complete search history.

(56) References Cited

U.S. PATENT DOCUMENTS

| | | | | |
|---|---|---|---|---|
| 4,146,873 A | * | 3/1979 | Yamanaka et al. ............ | 714/805 |
| 4,633,224 A | * | 12/1986 | Gipp et al. ........................ | 341/13 |
| 8,993,955 B2 | * | 3/2015 | Nakamura et al. ........ | 250/231.13 |
| 2012/0007593 A1 | * | 1/2012 | Yamazaki et al. ........ | 324/207.25 |
| 2014/0022559 A1 | * | 1/2014 | Mori et al. .................... | 356/614 |

FOREIGN PATENT DOCUMENTS

| | | |
|---|---|---|
| JP | 57-182707 | 11/1982 |
| JP | 4-270495 | 9/1992 |
| JP | 2002-357762 | 12/2002 |
| JP | 2007-17471 | 1/2007 |
| JP | 2007-87933 | 4/2007 |
| JP | 2007-286225 | 11/2007 |
| JP | 4923691 | 4/2012 |

* cited by examiner

*Primary Examiner* — W B Perkey

(74) *Attorney, Agent, or Firm* — Panasonic Patent Center

(57) ABSTRACT

A position detection device includes a first member, a second member, a plurality of detected components, a detector group, and a controller. The second member is opposed the first member and is configured to move relative to the first member in a specific direction. The plurality of detected components are disposed on the first member and faces the second member. The detector group is disposed on the second member and includes a plurality of detectors configured to detect the plurality of detected components. The controller is configured to detect a relative position of the second member relative to the first member based on a detection pattern in which detection results of the plurality of detectors are arranged in a row.

15 Claims, 8 Drawing Sheets

| Position No. | f-number | Detection pattern |
|---|---|---|
| 1 | 8 | ○ × × × × ○ |
| 2 | 7.1 | ○ ○ × × × × |
| 3 | 6.3 | ○ ○ ○ × × × |
| 4 | 5.6 | ○ ○ ○ ○ × × |
| 5 | 5 | ○ ○ ○ ○ ○ × |
| 6 | 4.5 | ○ ○ ○ ○ ○ ○ |
| 7 | 4 | × ○ ○ ○ ○ ○ |
| 8 | 3.5 | × × ○ ○ ○ ○ |
| 9 | 3.2 | × × × ○ ○ ○ |
| 10 | 2.8 | × × × × ○ ○ |
| 11 | 2.5 | × × × × × ○ |
| 12 | 2.2 | ○ × × × × × |
| 13 | 2 | × ○ × × × × |
| 14 | 1.8 | × × ○ × × × |
| 15 | 1.6 | × × × ○ × × |
| 16 | 1.4 | × × × × ○ × |

FIG. 8

POSITION DETECTION DEVICE

CROSS-REFERENCE TO RELATED APPLICATIONS

This application claims priority under 35 U.S.C. §119 to Japanese Patent Application No. 2012-158778, filed on Jul. 17, 2012. The entire disclosure of Japanese Patent Application No. 2012-158778 is hereby incorporated herein by reference.

BACKGROUND

1. Technical Field

The technical field relates to a position detection device that detects the relative positions of two members.

2. Background Information

A method was known in the past in which a slide switching device for setting imaging conditions was disposed on the side face of a cylindrical lens unit attached to a camera body (see Japanese Laid-Open Patent Application 2007-87933). With the slide switching device, a slide switching unit is provided that can be switched to three different positions.

SUMMARY

With the slide switching unit, however, the more switching positions there are, the more parts are needed, so the structure of the slide switching device ends up becoming complicated.

This disclosure provides a position detection device that is able to detect the relative positions of two members with a simple structure.

A position detection device disclosed herein includes a first member, a second member, a plurality of detected components, a detector group, and a controller. The second member is opposed to the first member and is configured to move relative to the first member in a specific direction. The plurality of detected components are disposed on the first member and face the second member. The detector group is disposed on the second member and includes a plurality of detectors configured to detect the plurality of detected components. The controller is configured to detect a relative position of the second member relative to the first member based on a detection pattern in which detection results of the plurality of detectors are arranged in a row.

The position detection device disclosed herein is able to detect the relative positions of two members with a simple structure.

BRIEF DESCRIPTION OF DRAWINGS

Referring now to the attached drawings which form a part of this original disclosure:

FIG. 8 is a lookup table in which f-numbers and detection patterns of the detector group are associated.

DETAILED DESCRIPTION OF EMBODIMENTS

An embodiment will be described in detail through reference to the drawings as needed. However, unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The inventor(s) provides the appended drawings and the following description so that a person skilled in the art may fully understand what is disclosed herein, and these should not be construed as limiting the subject discussed in the patent claims.

Embodiment 1

Embodiment 1 will be described through reference to FIGS. 1 to 8.

Overall Configuration of Digital Camera 100

Figure 1:
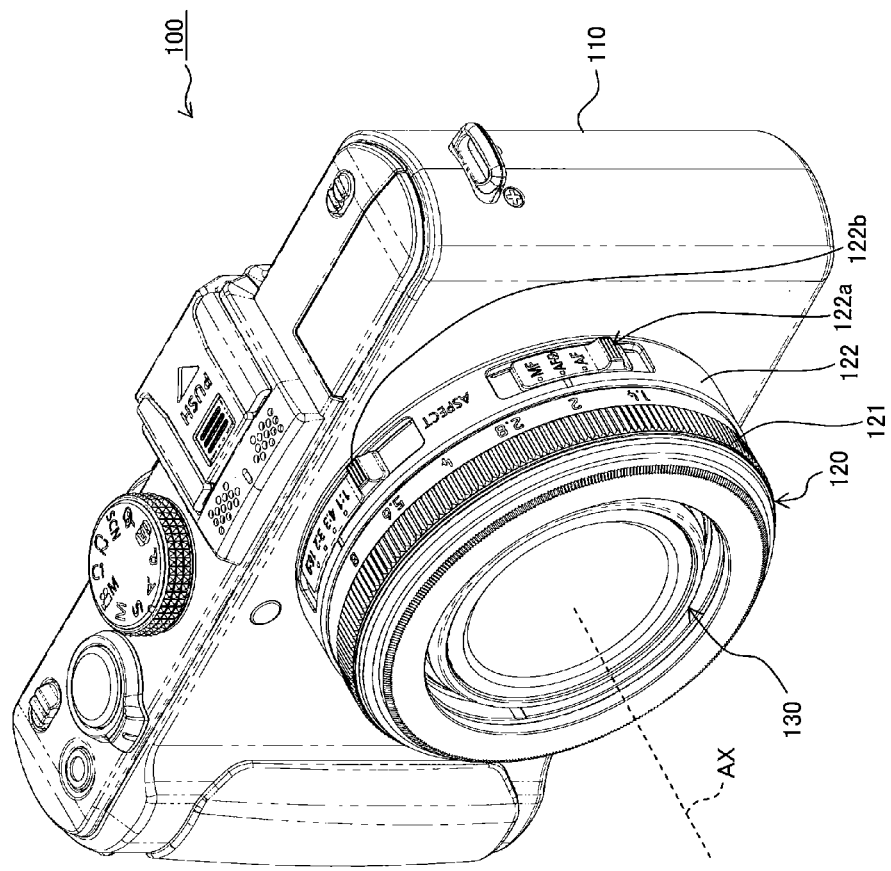
FIG. 1 is an oblique view of a camera body.
Figure 2:
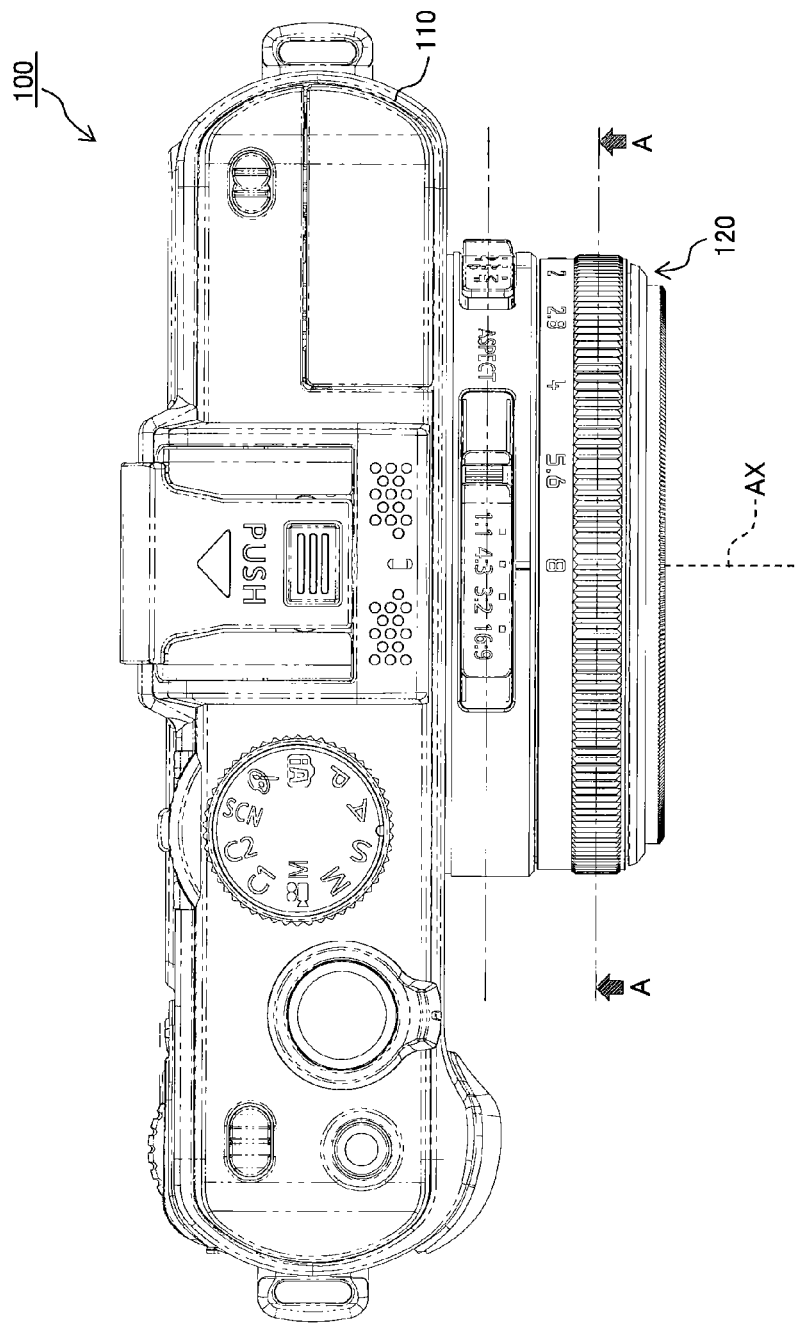
FIG. 2 is a top view of a camera body.

FIG. 1 is an oblique view of a digital camera 100. FIG. 2 is a top view of the digital camera 100. As shown in FIGS. 1 and 2, the digital camera 100 comprises a camera body 110, a lens ring unit 120, and a lens barrel 130.

Although not depicted, the camera body 110 houses an imaging element, a battery, a CPU (central processing unit), etc.

The lens ring unit 120 is attached to the front face of the camera body 110. The lens ring unit 120 houses the lens barrel 130. The lens ring unit 120 has a front ring 121 and a rear ring 122. The front ring 121 is an annular member used to adjust the quantity of light passing through the lens barrel 130. The rear ring 122 is disposed between the front ring 121 and the camera body 110. A first slide switch 122a and a second slide switch 122b are attached to the rear ring 122. The first slide switch 122a is a flat member used to switch between auto focus and manual focus. The second slide switch 122b is a flat member used to switch the aspect ratio of a captured image. The configuration of the lens ring unit 120 will be discussed below.

The lens barrel 130 is disposed to the inside of the lens ring unit 120. Although not depicted, the lens barrel 130 houses an optical system that includes a plurality of lenses. In FIGS. 1 and 2, the optical axis AX of the optical system is shown.

Configuration of Lens Ring Unit 120

Figure 3:
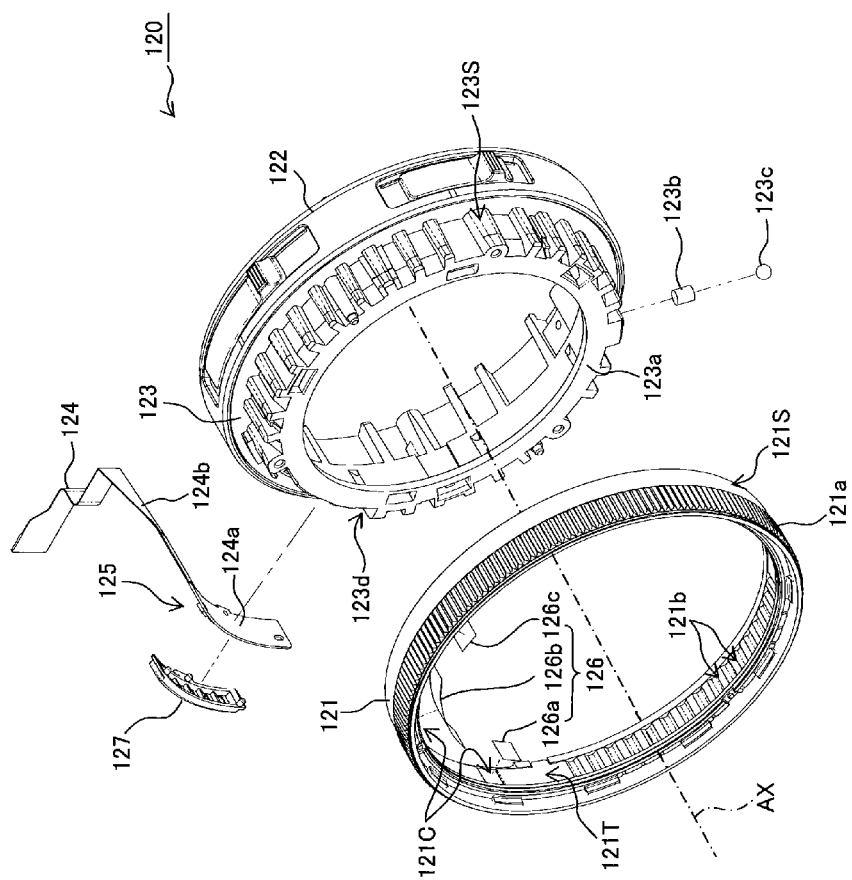
FIG. 3 is an exploded view of a lens ring unit.
Figure 4:
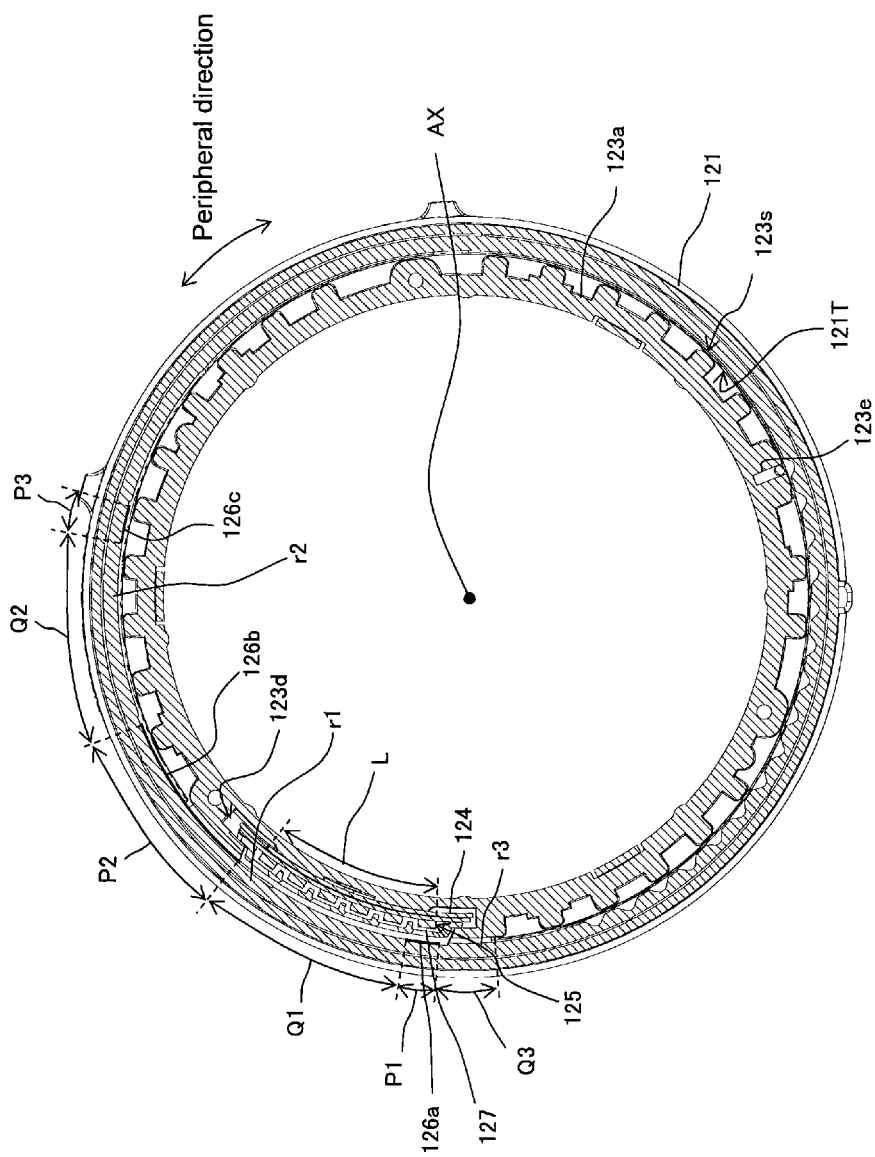
FIG. 4 is a cross section along the A-A line in FIG. 2.
Figure 5:
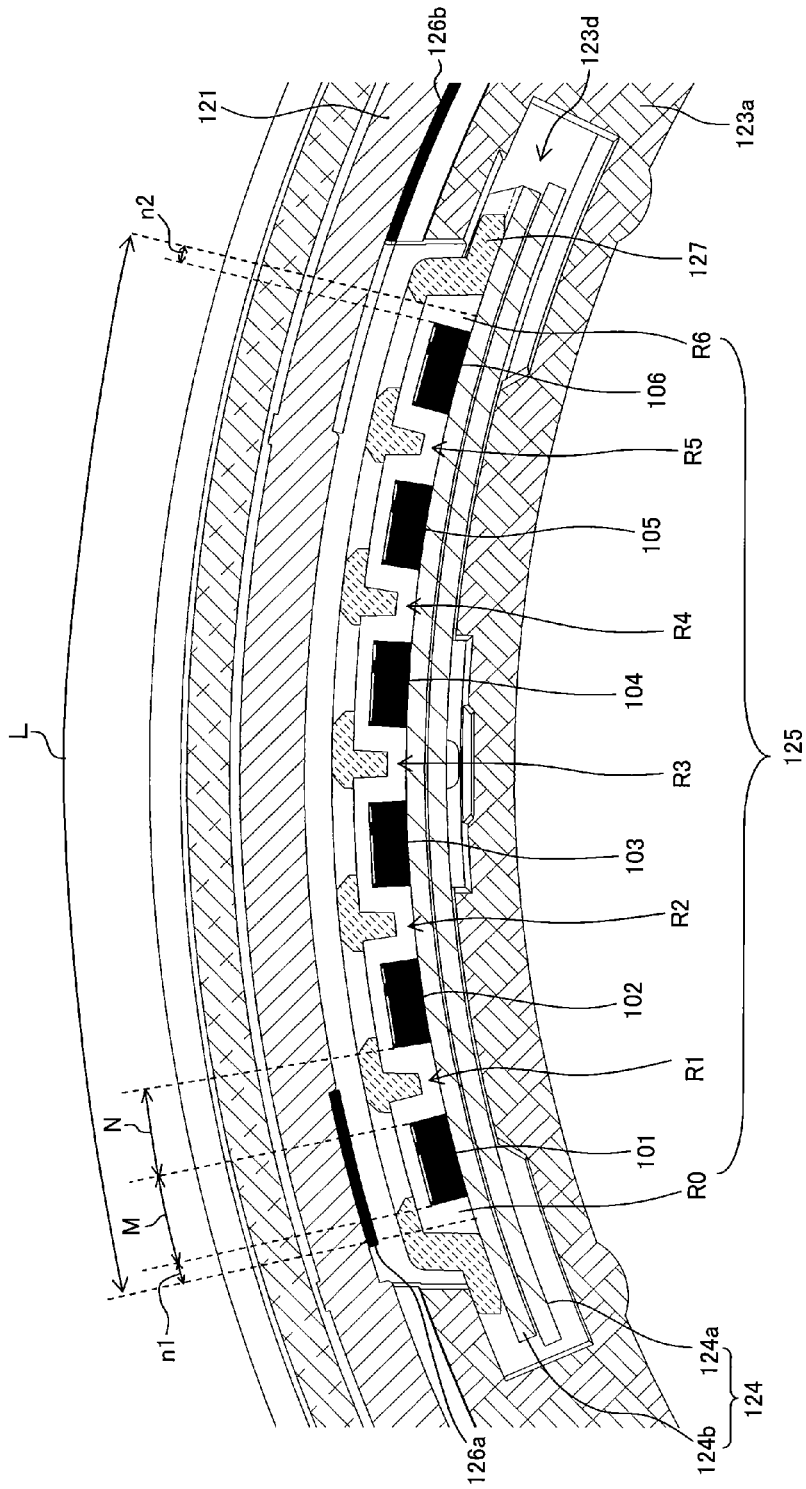
FIG. 5 is a detail enlargement of FIG. 4.

FIG. 3 is an exploded view of the lens ring unit 120. FIG. 4 is a cross section along the A-A line in FIG. 2. FIG. 5 is a detail enlargement of FIG. 4. In FIG. 3, a state is shown in which the rear ring 122 has been attached to the ring base 123.

As shown in FIGS. 3 and 4, the lens ring unit 120 comprises the front ring 121 (an example of a first member), the rear ring 122 (an example of a second member), a flexible substrate unit 124, a detector group 125, three reflectors 126 (an example of a plurality of detected components), and a cover 127. In this embodiment, the detector group 125 and the reflectors 126 constitute a position detection device that detects the relative position of the ring base 123 with respect to the front ring 121.

The front ring 121 is formed in a cylindrical shape. The front ring 121 is disposed to the outside of the ring base 123, using the optical axis AX as a reference. The center of the front ring 121 substantially coincides with the optical axis AX. The front ring 121 can be made of aluminum or another such metal, but is not limited to this. The front ring 121 may also be made up of a plurality of parts.

The front ring 121 has a grasping part 121a, a holder 121b, and three concave faces 121c (only two concave faces 121c are shown in FIG. 3).

The grasping part 121a is the place grasped by the user's hand when the user adjusts the aperture. The grasping part 121a consists of fine bumps formed on an outer peripheral face 121S. The grasping part 121a is formed all the way around the outer peripheral face 121S.

The holder 121b consists of 16 concavities formed in an inner peripheral face 121T. When the user turns the front ring 121 about the optical axis AX, a ball 123c successively fits into these 16 concavities and gives a clicking sensation. Specifically, when the ball 123c is held in the holder 121b, the position of the front ring 121 about the optical axis AX is temporarily fixed. This holder 121b is disposed aligned with the three concave faces 121c in the inner peripheral face 121T. Specifically, the holder 121b and the three concave faces 121c are arranged about the optical axis AX. Consequently, this affords a compact layout of a mechanism for fixing the position of the front ring 121 about the optical axis AX and a mechanism for detecting the relative position of the front ring 121.

The three concave faces 121c are formed in the inner peripheral face 121T. The three concave faces 121c are arranged in the peripheral direction whose center is the optical axis AX. The three concave faces 121c have a shape that corresponds to the external shape of the three reflectors 126. The three concave faces 121c serve as markers for positioning the three reflectors 126 when the three reflectors 126 are affixed. At least part of the three reflectors 126 is housed in the three concave faces 121c, so the reflectors 126 do not stick out as much from the inner peripheral face 121T. The inner peripheral face 121T is made of a material that does not reflect much light. Therefore, when light emitted from the detector group 125 shines on the inner peripheral face 121T, the light is absorbed by the front ring 121, so less light is reflected to the detector group 125.

The ring base 123 is formed in an annular shape. The ring base 123 is disposed to the inside of the front ring 121 and the rear ring 122, using the optical axis AX as a reference. Specifically, the ring base 123 is opposite the front ring 121 in the radial direction, with optical axis AX at the center. The center of the ring base 123 substantially coincides with the optical axis AX. The front ring 121 rotates about the ring base 123. In other words, the ring base 123 is configured to move relative to the front ring 121 in the peripheral direction.

The ring base 123 has an annular component 123a, a spring 123b, the ball 123c, and a housing 123d.

The annular component 123a is disposed to the inside of the front ring 121. The annular component 123a rotatably supports the front ring 121. When the front ring 121 moves (that is, rotates) relatively in the peripheral direction with respect to the annular component 123a, the outer peripheral face 123S of the annular component 123a slides over the inner peripheral face 121T of the front ring 121.

The spring 123b is supported in a concavity 123e (see FIG. 4) formed in the outer peripheral face 123S of the annular component 123a. The spring 123b biases the ball 123c outward in the radial direction, with the optical axis AX at the center. The ball 123c is pressed against the inner peripheral face 121T of the front ring 121 by the biasing force of the spring 123b. Therefore, when the front ring 121 moves relatively in the peripheral direction with respect to the annular component 123a, the ball 123c moves through the plurality of concavities that make up the holder 121b, one after the other. This imparts a click when the user turns the front ring 121. A leaf spring having an outward-facing convex shape may be used instead of the ball 123c.

The housing 123d is a concavity formed in the outer peripheral face 123S of the annular component 123a. The detector group 125 is housed in the housing 123d.

The flexible substrate unit 124 has a rigid part 124a and a flexible part 124b. The rigid part 124a is an arc-shaped flat member made of metal or resin. The rigid part 124a is fixed to the bottom face of the housing 123d of the annular component 123a. One end of the flexible part 124b is affixed on the rigid part 124a (see FIG. 5). The flexible part 124b is made of an insulating material that is flexible. Polyethylene terephthalate, polyimide, and other such insulating resins can be used favorably as this material, but the material is not limited to these. The detector group 125 is disposed on the outer peripheral face of one end of the flexible part 124b. The flexible part 124b is electrically connected to the detector group 125. The other end of the flexible part 124b is electrically connected to a controller (not shown; hereinafter referred to as the "controller 200") disposed inside the camera body 110.

The detector group 125 is disposed on the outer peripheral face of one end of the flexible part 124b. Therefore, the detector group 125 is opposite the inner peripheral face 121T of the front ring 121. As shown in FIG. 4, the detector group 125 is disposed in the peripheral direction. The detector group 125 has a length L in the peripheral direction.

As shown in FIG. 5, the detector group 125 has six detectors 101 to 106 (an example of the plurality of detectors). The six detectors 101 to 106 are each made up of an LED light source that emits light outward in the radial direction, and a photosensor that detects light reflected by the three reflectors 126. The six detectors 101 to 106 each output a detection signal to the controller 200 via the flexible part 124b when reflected light is detected by the photosensor. The outer periphery of each of the six detectors 101 to 106 is covered by a cover 127. This reduces the amount of light emitted from the six detectors 101 to 106 that ends up being incident on the other adjacent detectors.

The six detectors 101 to 106 all have the same configuration. More specifically, the six detectors 101 to 106 each have a length M in the peripheral direction. The six detectors 101 to 106 are also uniformly separated from each other. Therefore, five gaps R1 to R5 are formed between the six detectors 101 to 106. The lengths of the five gaps R1 to R5 in the peripheral direction are all the same. More specifically, the five gaps R1 to R5 each have a length N (an example of a first spacing) in the peripheral direction. In this embodiment, the sum of the total length 5N of the five gaps R1 to R5 and the total length 6M of the six detectors 101 to 106 is equal to the click interval created by the ball 123c.

As shown in FIG. 5, the detector group 125 is provided with first and second end gaps R0 and R6 at the two ends of the six detectors 101 to 106. The first end gap R0 has a length n1 in the peripheral direction, and the second end gap R6 has a length n2 in the peripheral direction. The lengths n1 and n2 are each at least "0" and no more than "N."

Therefore, the following formulas (1) and (2) apply with the detector group 125.

$$L \geq 6M + 5N + n1 + n2 \quad (1)$$

$$6M + 7N \geq L \geq 6M + 5N \quad (2)$$

In Formula 1, L is the peripheral direction length of the detector group 125. 6M is the sum of the peripheral direction lengths of the six detectors 101 to 106. 5N is the sum of the peripheral direction lengths of the five gaps R1 to R5. n1 and n2 are the peripheral direction lengths of the first and second end gaps R0 and R6. In Formula 2, 7N is the maximum value of 5N+n1+n2, and 5N is the minimum value of 5N+n1+n2, and 5N.

As shown in FIG. 3, the three reflectors 126 are disposed in the three concave faces 121c of the front ring 121. The three reflectors 126 consist of members that reflect light. Therefore, when light emitted by the detector group 125 shines on the reflectors 126, the light is reflected by the reflectors 126, so more light is reflected to the detector group 125.

As shown in FIGS. 3 and 4, the three reflectors 126 are made up of a first reflector 126a (an example of a first detected component), a second reflector 126b (an example of a second detected component), and a third reflector 126c (an example of a third detected component). The first reflector 126a, second reflector 126b, and third reflector 126c are disposed in that order in the peripheral direction. The first reflector 126a and the second reflector 126b are separated in the peripheral direction, and the second reflector 126b and the third reflector 126c are separated in the peripheral direction.

As shown in FIG. 4, the first reflector 126a has a length P1 in the peripheral direction. The second reflector 126b has a length P2 in the peripheral direction. The third reflector 126c has a length P3 in the peripheral direction.

The length P1 of the first reflector 126a corresponds to the length M of each of the six detectors 101 to 106. However, the length P1 of the first reflector 126a may be set between the length of the detectable range of the detectors 101 to 106 and the length of the range in which no misdetection occurs. More specifically, the length P1 of the first reflector 126a can be at least "M" and no more than "M+2N." The length P2 of the second reflector 126b corresponds to the length L of the detector group 125. More specifically, the length P2 of the second reflector 126b can be at least "6M+5N" and no more than "6M+7N," just as with the length L of the detector group 125. The length P3 of the third reflector 126c is the same as the length P1 of the first reflector 126a. In this embodiment, the concept of the dimensions of two members "corresponding" encompasses not only their being the same, but also error to the extent of the length N of the gaps, taking into account the detection range of the detectors.

The first reflector 126a and the second reflector 126b are separated by a spacing Q1 in the peripheral direction. Therefore, the inner peripheral face 121T of the front ring 121 is exposed between the first reflector 126a and the second reflector 126b. Also, the second reflector 126b and the third reflector 126c are separated by a spacing Q2 in the peripheral direction. Therefore, the inner peripheral face 121T of the front ring 121 is exposed between the second reflector 126b and the third reflector 126c.

The spacing Q1 of the first reflector 126a and the second reflector 126b here is greater than the length P1 of the first reflector 126a and is less than the length P2 of the second reflector 126b. The spacing Q2 of the second reflector 126b and the third reflector 126c is less than the length P2 of the second reflector 126b and greater than the length P3 of the third reflector 126c. The spacing Q1 is different from the spacing Q2.

As discussed above, the inner peripheral face 121T of the front ring 121 is made up of a material that does not reflect much light. Therefore, the front ring 121 forms a first absorber r1, a second absorber r2, and a third absorber r3, as shown in FIG. 4. The first absorber r1 is formed between the first reflector 126a and the second reflector 126b, and has a length Q1 (an example of a second spacing) in the peripheral direction. The second absorber r2 is formed between the second reflector 126b and the third reflector 126c, and has a length Q2 (an example of a third spacing) in the peripheral direction. The third absorber r3 is formed on the opposite side from the second reflector 126b, using the first reflector 126a as a reference, and has a length Q3 in the peripheral direction.

The length Q1 of the first absorber r1 corresponds to the length of five of the six detectors 101 to 106. However, the length Q1 of the first absorber r1 may be set between the length of the detectable range of the detectors 101 to 106 and the length of the range in which no misdetection occurs. More specifically, the length Q1 of the first absorber r1 can be at least "5M+4N" and no more than "5M+6N."

The length Q2 of the second absorber r2 corresponds to the length of four of the six detectors 101 to 106. However, the length Q2 of the second absorber r2 may be set between the length of the detectable range of the detectors 101 to 106 and the length of the range in which no misdetection occurs. More specifically, the length Q2 of the second absorber r2 can be at least "4M+3N" and no more than "4M+5N."

The length Q3 of the third absorber r3 corresponds to the length of four of the six detectors 101 to 106. However, the length Q3 of the third absorber r3 may be set to the length of the detectable range of the detectors 101 to 106. More specifically, the length Q3 of the third absorber r3 can be at least "4M+3N."

The following formulas (3) to (8) apply to the first to third reflectors 126a to 126c and the first to third absorbers r1 to r3.

$$M+2N \geq P1 \geq M \tag{3}$$

$$6M+7N \geq P2(=L) \geq 6M+5M \tag{4}$$

$$M+2N \geq P3 \geq M \tag{5}$$

$$5M+6N \geq Q1 \geq 5M+4N \tag{6}$$

$$4M+5N \geq Q2 \geq 4M+3N \tag{7}$$

$$Q3 \geq 4M+3N \tag{8}$$

In Formulas 3 to 8, M is the peripheral direction length of the detectors 101 to 106. N is the peripheral direction length of the gaps R1 to R5. L is the peripheral direction length of the detector group 125.

Recognition of 16 positions can be determined with the lens ring unit 120 constituted as above. Specifically, it can be determined which of 16 positions the front ring 121 is in with respect to the ring base 123. In this embodiment, an f-number indicating the aperture is associated with each of the 16 positions, and the user can adjust the aperture by turning the front ring 121 to the desired position out of these 16 positions.

Operation of Digital Camera 100

Figure 6:
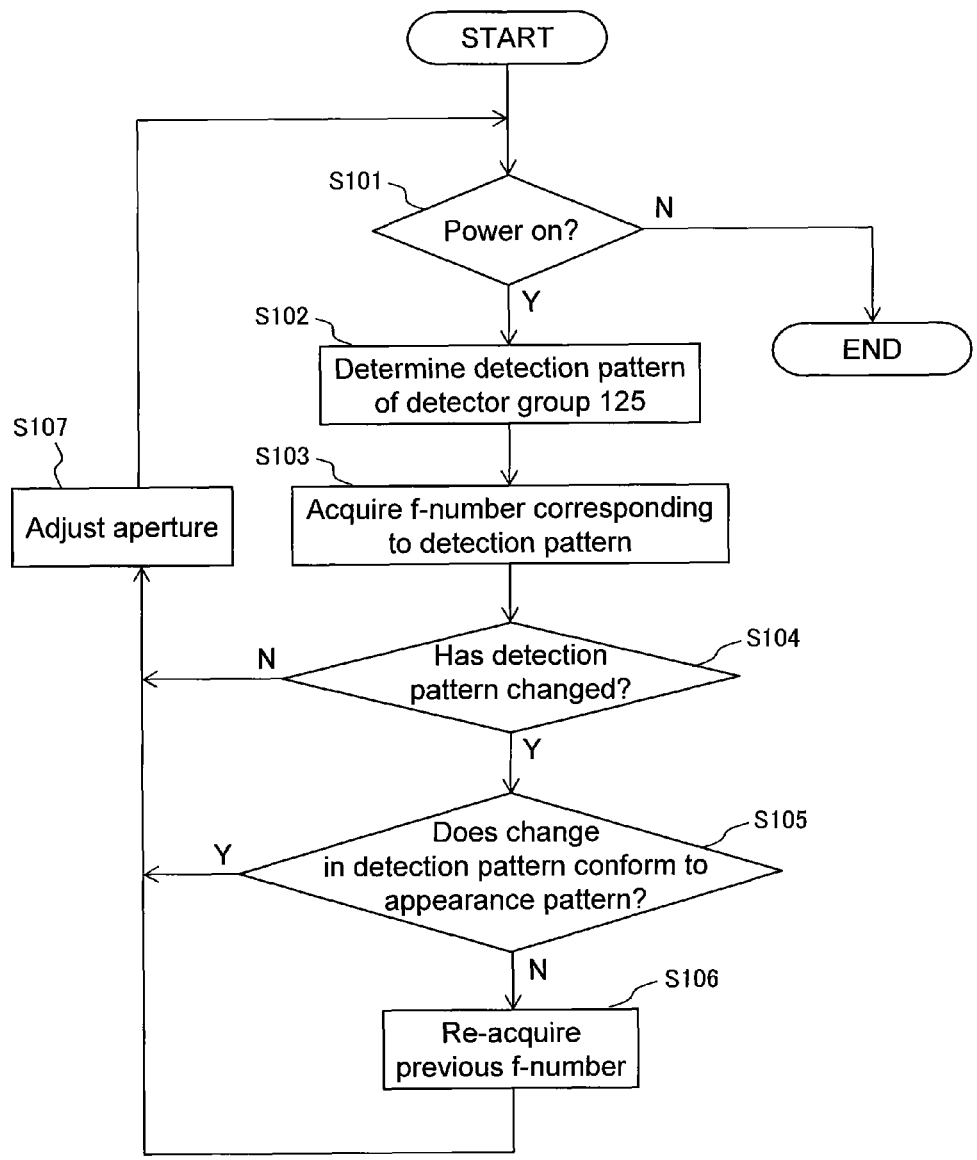
FIG. 6 is a flowchart illustrating the operation of the controller.
Figure 7:
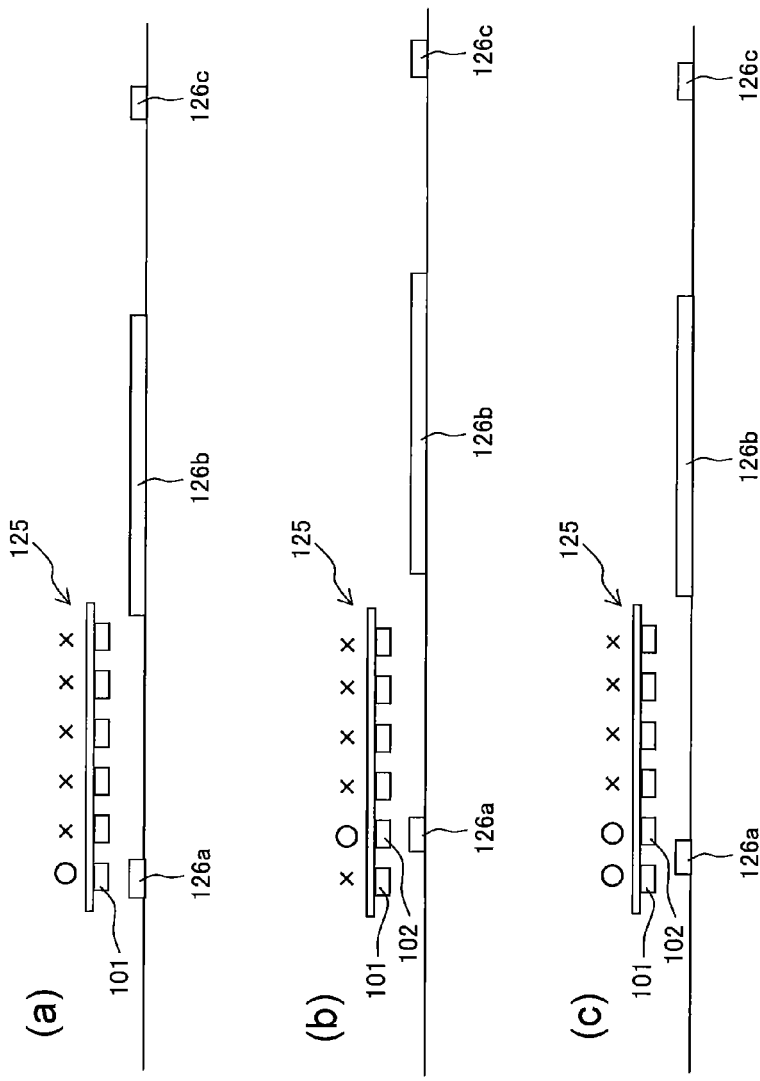
FIG. 7 is a schematic diagram illustrating how the reflectors move with respect to the detector group.

The operation by which the digital camera 100 (more specifically, the controller 200) sets the f-number will be described through reference to the drawings. FIG. 6 is a flowchart illustrating the operation of the controller 200. FIG. 7 is a schematic diagram illustrating how the first to third reflectors 126a to 126c move with respect to the detector group 125. FIG. 8 is a lookup table in which f-numbers and detection patterns of the detector group 125 are associated.

As shown in FIG. 8, the detection pattern of the detector group 125 is a type in which the detection results of the six detectors 101 to 106 are arranged in order. In FIG. 8, the detection result is expressed as "o" when the first to third reflectors 126a to 126c are detected, and the detection result is expressed as "x" when the first to third reflectors 126a to 126c are not detected. In FIG. 8 an example is given in which the detection pattern changes among 16 different patterns, and all of these 16 patterns are different from one another. This lookup table is stored in the memory of the controller 200.

In step S101, the controller 200 determines whether or not the power is on. If the power is on, the processing proceeds to step S102, but if the power is off, the processing ends.

In step S102, the controller 200 receives the output of the detector group 125 (namely, the detection result), and determines the detection pattern of the detector group 125. More specifically, in the example shown in FIG. 7a, since the first reflector 126a is opposite just the detector 101, the controller 200 acquires "oxxxxx" as the detection pattern.

In step S103, the controller 200 refers to the lookup table in FIG. 8 and acquires an f-number corresponding to the detection pattern of the detector group 125. More specifically, in the example shown in FIG. 7a, the controller 200 acquires an f-number of "2.2" that corresponds to the detection pattern "oxxxxx."

In step S104, the controller 200 determines whether or not the current detection pattern has changed from the previous detection pattern. If the detection pattern has changed, the processing proceeds to step S105, but if the detection pattern has not changed, the processing proceeds to step S107. More specifically, the controller 200 determines that the detection pattern has changed if it has changed from the detection pattern "oxxxxx" in FIG. 7a to the detection pattern "xoxxxx" in FIG. 7b or the "ooxxxx" in FIG. 7c. If there is no previous detection pattern, the controller 200 determines that the detection pattern has not changed.

In step S105, the controller 200 determines whether or not the change in the detection pattern conforms to a specific appearance pattern. An appearance pattern is the sequence in which the detection patterns shown in the lookup table in FIG. 8 change. If the change conforms to an appearance pattern, the processing proceeds to step S107, and otherwise the processing proceeds to step S106. More specifically, if the detection pattern "oxxxxx" in FIG. 7a has changed to the detection pattern "xoxxxx" in FIG. 7b, the controller 200 determines that there has been a change from position No. 12 in FIG. 8 to position No. 13 according to an appearance pattern. On the other hand, if the detection pattern "oxxxxx" in FIG. 7a has changed to the detection pattern "ooxxxx" in FIG. 7c, the controller 200 determines that there has been an irregular change from position No. 12 in FIG. 8 to position No. 2. In FIG. 7c, a state is shown in which the first reflector 126a has been detected by both of the detectors 101 and 102.

In step S106, the controller 200 reacquires the previous f-number since the detection pattern does not conform to an appearance pattern. Along with this, the controller 200 discards the f-number acquired in step S103. Specifically, the controller 200 determines that there has been no change in the relative positions of the front ring 121 and the ring base 123.

In step S107, the controller 200 adjusts the aperture according to the f-number acquired in step S103 or step S106.

Action and Effect (1) The position detection device pertaining to this embodiment comprises the front ring 121 (an example of a first member), the ring base 123 (an example of a second member), the three reflectors 126 (an example of a plurality of detected components), the detector group 125 including the six detectors 101 to 106 (an example of a plurality of detectors), and the controller 200. The controller 200 detects the relative position of the ring base 123 with respect to the front ring 121 based on the detection pattern of the six detectors 101 to 106 (an example of a detection result).

Thus, since the position detection device comprises the three reflectors 126 and the six detectors 101 to 106, the number of positions that can be detected can be maximized, and a simple configuration can be maintained.

Also, since the relative positions are detected based on the detection pattern of the six detectors 101 to 106, rather than merely detecting the relative movement of reflecting members with detectors, the relative positions can be detected from the point when the power is turned on, for example.

(2) Also, when the change in the detection pattern does not conform to the appearance pattern in FIG. 8, the controller 200 determines that there has been no change in the relative positions of the front ring 121 and the ring base 123.

Therefore, there will be less misdetection of the relative positions when the first reflector 126a ends up detecting both of the detectors 101 and 102, as shown in FIG. 7c.

Other Embodiments

The present invention was described by the above embodiment, but the text and drawings that form a part of this disclosure should not be construed as limiting the invention. Various alternative embodiments, working examples, and application techniques should be clear to a person skilled in the art from this disclosure.

(A) In the above embodiment, the position detection device comprised the three reflectors 126 as an example of a plurality of detected components, but this is not the only option. The position detection device may comprise two, or four or more reflecting members.

(B) In the above embodiment, the position detection device comprised the six detectors 101 to 106 as an example of a plurality of detectors, but this is not the only option. The position detection device may comprise two or more detectors.

(C) In the above embodiment, the position detection device comprised the front ring 121 as an example of a first member, and comprised the ring base 123 as an example of a second member, but this is not the only option. The position detection device may comprise two opposing members, and the two members may each be in the form of a plate, etc.

(D) In the above embodiment, the three reflectors 126 were attached to the inner peripheral face 121T of the front ring 121, and the detector group 125 was attached to the outer peripheral face 123S of the ring base 123, but this is not the only option. The detector group 125 may be attached to the inner peripheral face 121T of the front ring 121, and the three reflectors 126 may be attached to the outer peripheral face 123S of the ring base 123.

(E) In the above embodiment, the dimensional relation between the first to third reflectors 126a to 126c and the six detectors 101 to 106 was expressed by Formulas 1 to 8, but this is not the only option. The required action and effect can be obtained as long as the relations of the following formulas (9) to (11) apply in the position detection device.

$$P1 \geq M \tag{9}$$

$$P2 > M \tag{10}$$

$$L \geq Q1, Q2 \geq M \tag{11}$$

Also, it is preferable with the position detection device if the relations of the following formulas (12) to (15) apply in the position detection device.

$$P3 \geq M \tag{12}$$

$$P2 \approx L \tag{13}$$

$$Q1 = (i-2)M + (i-3)N \tag{14}$$

$$Q2 = (i-1)M + (i-2)N \tag{15}$$

In Formulas 14 and 15, "i" is the number of detectors. In Formulas 13, 14, and 15, it should be noted that the dimensions on both sides do not have to coincide completely, and need only be set to mutually corresponding dimensions.

(F) In the above embodiment, in Formulas 1 and 2, the length n1 of the first end gap R0 and the length n2 of the second end gap R6 were each said to be no more than "N," but this is not the only option. The lengths n1 and n2 may each be slightly greater than "N." More specifically, the lengths n1 and n2 may each be set to at least "0" and no more than "N+N×0.2."

What is claimed is:

1. A position detection device, comprising:
   a first member;
   a second member disposed opposite to the first member, the second member configured to move relative to the first member in a specific direction;
   a plurality of detected components disposed on the first member in the specific direction, the plurality of detected components facing the second member;
   a detector group disposed on the second member, the detector group including a plurality of detectors disposed in the specific direction and configured to detect the plurality of detected components disposed on the first member; and
   a controller configured to detect a relative position of the second member relative to the first member based on a predetermined detection pattern of detection results of the plurality of detectors,
   wherein the detection pattern is formed based on a relative relationship between the position of the plurality of detected components and the position of the plurality of detectors.

2. The position detection device according to claim 1, wherein
   the plurality of detectors are disposed at a first spacing in the specific direction,
   the plurality of detected components include a first detected component and a second detected component that are disposed at a second spacing in the specific direction, and
   a length of the first detected component is greater than or equal to a length corresponding to at least one detector among the plurality of detectors in the specific direction,
   a length of the second detected component is greater than the length of the first detected component in the specific direction, and
   the second spacing is greater than or equal to the length corresponding to the at least one detector in the specific direction, and is less than a length corresponding to the detector group in the specific direction.

3. The position detection device according to claim 2, wherein
   the plurality of detected components have a third detected component,
   the third detected component is disposed opposite to the first detected component with the second detected component disposed therebetween as a reference, and is disposed at a third spacing from the second detected component in the specific direction, and
   a length of the third detected component is greater than or equal to the length corresponding to the at least one detector in the specific direction.

4. The position detection device according to claim 3, wherein
   the length of the second detected component is equal to the length corresponding to the detector group in the specific direction,
   the second spacing is equal to the length corresponding to detectors that is two less than the plurality of detectors, and
   the third spacing is equal to the length corresponding to detectors that is one less than the plurality of detectors.

5. The position detection device according to claim 1, wherein
   the first member and the second member are formed in a cylindrical shape, and
   the first member is configured to rotate relative to the second member about an axial center of the second member.

6. A position detection device, comprising:
   a first member;
   a second member disposed opposite to the first member the second member configured to move relative to the first member in a specific direction;
   a plurality of detected components disposed on the first member in the specific direction, the plurality of detected components facing the second member;
   a detector group disposed on the second member, the detector group including a plurality of detectors disposed in the specific direction and configured to detect the plurality of detected components disposed on the first member; and
   a controller configured to detect a relative position of the second member relative to the first member based on a predetermined detection pattern of detection results of the plurality of detectors;
   wherein:
   the detection pattern changes among a plurality of patterns according to a movement of the second member relative to the first member, and
   the controller is configured to determine that the second member has not moved relative to the first member when a change in the detection pattern does not conform to a specific appearance pattern.

7. A position detection device, comprising:
   a first member;
   a second member disposed opposite to the first member, the second member configured to move relative to the first member in a specific direction;
   a plurality of detected components disposed on the first member, the plurality of detected components facing the second member;
   a detector group disposed on the second member, the detector group including a plurality of detectors configured to detect the plurality of detected components disposed on the first member; and
   a controller configured to detect a relative position of the second member relative to the first member based on a predetermined detection pattern of detection results of the plurality of detectors, wherein:
   the plurality of detectors are disposed at a first spacing in the specific direction,
   the plurality of detected components have a first detected component, a second detected component and a third detected component, the second detected component disposed at a second spacing from the first detected component in the specific direction, and the third detected component disposed at a third spacing from the second detected component in the specific direction,
   a length of each of the first to third detected components is greater than or equal to a length of each of the plurality of detectors,
   the second spacing is greater than a length of the first detected component and less than a length of the second detected component, and the third spacing is less than the length of the second detected component, greater than a length of the third detected component, and different from the second spacing.

8. A position detection device according to claim 1, wherein:
the detection pattern changes among a plurality of patterns according to a movement of the second member relative to the first member, and
the plurality of patterns are different from one another.

9. The position detection device according to claim 6, wherein
the first member and the second member are formed in a cylindrical shape, and
the first member is configured to rotate relative to the second member about an axial center of the second member.

10. The position detection device according to claim 3, wherein
the first member and the second member are formed in a cylindrical shape, and
the first member is configured to rotate relative to the second member about an axial center of the second member.

11. The position detection device according to claim 4, wherein
the first member and the second member are formed in a cylindrical shape, and
the first member is configured to rotate relative to the second member about an axial center of the second member.

12. The position detection device according to claim 1, wherein
the detection pattern changes among a plurality of patterns according to a movement of the second member relative to the first member, and
the controller is configured to determine that the second member has not moved relative to the first member when a change in the detection pattern does not conform to a specific appearance pattern.

13. The position detection device according to claim 3, wherein
the detection pattern changes among a plurality of patterns according to a movement of the second member relative to the first member, and
the controller is configured to determine that the second member has not moved relative to the first member when a change in the detection pattern does not conform to a specific appearance pattern.

14. The position detection device according to claim 4, wherein
the detection pattern changes among a plurality of patterns according to a movement of the second member relative to the first member, and
the controller is configured to determine that the second member has not moved relative to the first member when a change in the detection pattern does not conform to a specific appearance pattern.

15. The position detection device according to claim 1, wherein a pattern that the plurality of detected components are disposed and a pattern that the plurality of detectors are disposed are different.

* * * * *